(12) United States Patent
Liu et al.

(10) Patent No.: US 9,369,997 B2
(45) Date of Patent: Jun. 14, 2016

(54) METHODS AND ARRANGEMENTS FOR COORDINATING UPLINK TRANSMIT DIVERSITY MODE ADAPTATION

(75) Inventors: Jinhua Liu, Beijing (CN); Johan Bergman, Stockholm (SE); Johan Hultell, Solna (SE); Qingyu Miao, Beijing (CN)

(73) Assignee: Optis Cellular Technology, LLC, Plano, TX (US)

( * ) Notice: Subject to any disclaimer, the term of this patent is extended or adjusted under 35 U.S.C. 154(b) by 223 days.

(21) Appl. No.: 13/981,700

(22) PCT Filed: Jan. 26, 2011

(86) PCT No.: PCT/SE2011/050086
§ 371 (c)(1),
(2), (4) Date: Jul. 25, 2013

(87) PCT Pub. No.: WO2012/102652
PCT Pub. Date: Aug. 2, 2012

(65) Prior Publication Data
US 2013/0308589 A1 Nov. 21, 2013

(51) Int. Cl.
*H04J 11/00* (2006.01)
*H04W 72/04* (2009.01)
(Continued)

(52) U.S. Cl.
CPC ......... *H04W 72/0413* (2013.01); *H04B 7/0404* (2013.01); *H04B 7/06* (2013.01);
(Continued)

(58) Field of Classification Search
CPC .. H04B 7/0404; H04B 7/0413; H04B 7/0619; H04W 72/0413; H04J 11/00
See application file for complete search history.

(56) References Cited

U.S. PATENT DOCUMENTS

2005/0047393 A1* 3/2005 Liu .................. H04L 12/6418 370/352
2010/0080136 A1* 4/2010 Hunzinger ........... H04B 7/0404 370/252
(Continued)

FOREIGN PATENT DOCUMENTS

| EP | 1806942 A1 | 7/2007 |
|---|---|---|
| EP | 1833268 A1 | 9/2007 |

(Continued)

OTHER PUBLICATIONS

R1-106363, "UL Transmission Modes for LTE-A Operation", 3GPP TSG-RAN WG1 #63, Nov. 15-19, 2010, pp. 1-4.*
(Continued)

*Primary Examiner* — Andrew Chriss
*Assistant Examiner* — Salvador E Rivas
(74) *Attorney, Agent, or Firm* — Lewis W. Schiel; Thomas L. Crisman

(57) ABSTRACT

Methods and arrangements in a control node, a base station and a UE, for achieving a UE up link transmit diversity mode adaptation, which is coordinated between a base station and a control node. The methods and arrangements involve the control node indicating a set of allowed up link transmit diversity modes to the base station. Further, an up link transmit diversity mode for the mobile terminal is selected in the base station, from amongst the currently allowed up link transmit diversity modes; where the selection is based on information concerning the mobile terminal which is available in the base station. The base station then indicates the selected up link transmit diversity mode to the mobile terminal, which changes to the up link transmit diversity mode indicated by the base station. The methods and arrangements enable a faster and more flexible UE up link transmit diversity mode adaptation.

26 Claims, 13 Drawing Sheets

(51) Int. Cl.
*H04B 7/06* (2006.01)
*H04B 7/04* (2006.01)

(52) U.S. Cl.
CPC ........... *H04B 7/0619* (2013.01); *H04B 7/0628* (2013.01); *H04J 11/00* (2013.01); *H04B 7/0413* (2013.01); *H04B 7/063* (2013.01)

(56) References Cited

U.S. PATENT DOCUMENTS

| 2011/0064115 | A1* | 3/2011 | Xu | H04L 1/0618 375/130 |
| 2011/0080876 | A1* | 4/2011 | Yin | H03M 13/6525 370/329 |
| 2011/0249566 | A1* | 10/2011 | Bergman | H04W 48/08 370/241 |
| 2011/0286347 | A1* | 11/2011 | Mohanty | H04B 7/0689 370/252 |

FOREIGN PATENT DOCUMENTS

| EP | 2276305 A1 | 1/2011 |
| WO | 2008076024 A1 | 6/2008 |
| WO | 2008133576 A1 | 11/2008 |

OTHER PUBLICATIONS

R1-110489, 3GPP TSG RAN WG1 Meeting #63bis, Dublin, Ireland, Jan. 17-21, 2011, Source: Ericsson, ST-Ericsson, Title: On the design of uplink closed loop transmit deversity for HSUPA, 6 pages.

R1-106336, 3GPP TSG RAN WG1 Meeting #63, Jacksonville, USA, Nov. 15-19, 2010, Source: Qualcomm Incorporated, Title: Introduction to UL MIMO in HSPA, pp. 1-10.

R1-102931, 3GPP-TSG-RAN WG1 Meeting #61, Montreal, Canada, May 10-14, 2010, Source: Huawei, Title: Concept of UL Closed Loop Transmit Diversity, 6 pages.

3GPP TR 25.863 V11.0.0 (Dec. 2011) "3rd Generation Partnership Project; Technical Specification Group Radio Access Network; Universal Terrestrial Radio Access (UTRA); Uplink transmit diversity for High Speed Packet Access (HSPA)" (Release 11).

"UL multiple antenna transmission for LTE performance part", 5 pages.

"UL multiple antenna transmission for LTE core part", 5 pages.

"UL multiple antenna transmission for LTE", 5 pages.

* cited by examiner

2:1 – Configuration of UE UL TD mode (TD mode order)
2:2 – ACK/order accomplished 4:1 – Configuration of UE UL TD mode (TD mode order)
3:2 – UE UL TD mode change request or information
3:3 – Configuration of UE UL TD mode
3:4 – ACK/order accomplished (optional)

4a:1 – Configuration of UE UL TD mode (TD mode order)
4a:2 – Allowed UL TD modes (could be implicit)
4a:3 – indication/change order
4a:4 – ACK/order accomplished (optional)
4a:5 – info, current UE UL TD mode (optional)

4b:1 – Configuration of UE UL TD mode (TD mode order)
4b:2 – Allowed UL TD modes (could be implicit)
4b:3 – indication/change order
4b:4 – ACK/order accomplished (optional)
4b:5 – indication/change order
4b:6 – ACK/order accomplished (optional)

METHODS AND ARRANGEMENTS FOR COORDINATING UPLINK TRANSMIT DIVERSITY MODE ADAPTATION

CROSS-REFERENCE TO RELATED APPLICATION

This application is a 35 U.S.C. §371 National Phase Entry Application from PCT/SE2011/050086, filed Jan. 26, 2011, and designating the United States.

TECHNICAL FIELD

The invention relates to methods and arrangements for adaptation of the uplink transmit diversity mode of a mobile terminal in a cellular communication system.

BACKGROUND

Multiple-antenna technology is widely used in wireless communication systems, e.g. as the one illustrated in FIG. 1. For WCDMA-HSPA (Wideband Code Division Multiple Access—High Speed Packet Access) evolution, downlink 2 by 2 antenna MIMO (Multiple Input Multiple Output) was specified in 3GPP (3rd Generation Partnership Project) Release 7. Downlink (DL) MIMO was standardized for LTE (Long Term Evolution) in 3GPP Release 8. The introduction of multiple-antenna technology in the uplink is currently being discussed within 3GPP. The topics discussed include ULTD (UpLink Transmit Diversity) for WCDMA, and UL (UpLink) MIMO for LTE. The respective concepts of ULTD and UL MIMO require that UEs (User Equipment) should be provided with at least 2 TX (transmit) antennas.

Hereinafter, it is assumed that UEs are equipped with at least 2 TX antennas. For the sake of clarity, most examples herein relate to UEs provided with 2 TX antennas. The invention is, however, also valid for the cases where UEs and/or base stations (BSs) are equipped with more than 2 TX antennas and for UL MIMO beyond 2×2 antenna configuration.

UpLink Transmit Diversity

The concept of ULTD for WCDMA discussed within 3GPP includes the diversity schemes: AS (Antenna Switching) and BF (Beam Forming).

When applying antenna switching, a UE transmits from the TX antenna which for the moment has the better estimated uplink quality in terms of e.g. received uplink DPCCH (Dedicated Physical Control CHannel) power or DPCCH SINR (Signal-to-Interference-and-Noise Ratio). This in turn can be determined by the UE from the received UL TPC (Transmit Power Control) command sent by a Node B.

When applying beam forming, the UE transmits simultaneously from both TX antennas using weight factors, which are sometimes also referred to as a pre-coding vector, to maximize the estimated received power or SINR at the Node-B receiver.

The ULTD technology can, in most cases, improve the capacity and coverage of the communication system and/or reduce the UE battery consumption. There are two types of ULTD modes: Open Loop ULTD (OLTD) and Closed Loop ULTD (CLTD). In the closed loop mode, there is a specific downlink feedback channel from Node B to the UE, carrying the pre-coding vector or information to assist the generation of pre-coding vectors for ULTD. For open loop mode, there is no OLTD-specific downlink feedback channel from Node B to the UE to support the ULTD operation.

In CLTD, in order for the Node B to be able to generate the desired pre-coding information to the UE and provide it over the specific downlink feedback channel, the Node B should monitor the uplink channels. Traditionally the pre-coding vector is generated on the Node B side and is provided to the UE.

Alternatively, the Node B could send, e.g. only the CSI (Channel State Information) to the UE, which in turn could autonomously determine a suitable pre-coding vector based on the CSI.

It is realized that UL-MIMO may be a future concept also for standards such as WCDMA. Below, the transmit diversity modes OLTD, CLTD and UL-MIMO for WCDMA-HSPA will be described in further detail in a respective section.

OLTD for WCDMA-HSPA

The OLTD for WCDMA has been studied within the Release-10 time frame in 3GPP. The UE determines the transmit adaptation of the 2 TX antennas based on already existing available information, e.g. the TPC commands. The algorithms discussed for OLAS and for OLBF are described in [1].

Open Loop Antenna Switching (OLAS)

In case of OLAS, the UE typically comprises two TX antennas and a single full-power power amplifier. With the scheme described in [1], the UE TX antenna to be used is selected in the UE according to the TPC statistic:

1) Let TPC command DOWN be represented by −1 and TPC command UP by 1. Then let the UE accumulate all received TPC commands.
2) At each frame border the accumulated TPC sum is compared with 0. If the sum is larger than 0 the transmit antenna is switched.
3) If the same transmit antenna has been used for x consecutive frames the UE automatically switches antenna. x can be referred as the forced switch circle and determined according to the radio environments.
4) Every time an antenna switch occurs the accumulated TPC sum is reset to 0.

Open Loop Beam Forming (OLBF)

In case of OLBF, the UE typically comprises one power amplifier per TX antenna. With the algorithm described in [2], the UE adjusts the beam by adjusting the relative phase difference between two antennas based on the received TPCs, and could be described e.g. as follows in pseudo code:

A. The phase offset, $\delta$ can be 48 degrees, $\epsilon$ can be 12 degrees.
B. Let TPC command DOWN be represented by −1 and TPC command UP by +1.
   1. Initial relative phase between two transmitters $\Delta\phi=-\delta/2$ for the first slot (#1 slot). $\epsilon$ is kept zero until two TPC commands become available to the UE.
   2. Apply relative phase for the next slot $\Delta\phi=\Delta\phi+\delta$
   3. Determine new relative phase:
      a. if TPC1>TPC2, $\Delta\phi=\Delta\phi+\epsilon$
      b. if TPC2>TPC1, $\Delta\phi=\Delta\phi-\epsilon$
      c. otherwise, no change
      Note that TPC1 and TPC2 correspond to slot (1,2),(3,4), . . . , (i*2-1, i*2), where i=1 to n.
   4. Apply relative phase for the next slot $\Delta\phi=\Delta\phi-\delta$
   5. Go to step 2

A UE which is capable of UL OLTD could in principle be configured in default mode (fixed single TX antenna) or OLTD mode (OLAS or OLBF). There is no radio link reconfiguration or transport format change of the control channels when the transmit mode of a UE is changed between the default, OLAS and OLBF mode. This means that all cells in the active set can decode the data transmitted by the UE when the transmit mode is changed within the aforementioned range. The active set is the set of cells involved e.g. in a soft/softer handover for a particular UE. For example, the cells in the active set can all participate in the reception of data from the UE and they all transmit UL TPC commands to the UE. A set corresponding to the active set may be named differently in different cellular systems.

CLTD in WCDMA-HSPA

The CLTD mode was proposed in 3GPP RAN1-61 conference [2]. In [2], an uplink closed loop transmit diversity scheme based on the explicit uplink channel estimation and CSI feedback was proposed. Within this proposal, the network controls the UE behavior and the Node B decides the weights (pre-coding vector). The simulation results in [2] show that the average throughput gain reaches 14% in Pedestrian A channel (3 km/h) and up to 10% in Vehicular A (30 km/h) channel. Thus, CLTD can be a valuable complement, which should be further considered for improving the HSPA uplink. The CLTD mode includes CLBF (Closed Loop Beam Forming) and CLAS (Closed Loop Antenna Switching). CLBF implies that a desired signal is multiplied with a pre-coded vector determined by the network. CLAS implies that the signal is only transmitted on one antenna at the time, which antenna is selected by the network. Theoretically, CLBF could be used to transmit two streams. However, typically when discussing CLBF for e.g. WCDMA, only one stream is implied.

A UL CLTD UE can be configured in default mode, OLTD (OLAS or OLBF) mode and CLTD (CLAS or CLBF) mode. As previously mentioned, a cell in the active set can decode the data transmitted by a UE when the transmit mode of a UE is changed between the default, OLAS and OLBF mode. When the primary DPCCH is always pre-coded with the same precoding vector as the data part and the primary DPCCH configuration (e.g. spreading code, pilot sequences, transport format) is not changed due to the transmit mode change of a UE, a cell in the active set can always decode the data based on the estimated channel from the primary DPCCH when the transmit mode of a UE is changed within the range of default, OLAS, OLBF, CLAS and CLBF mode without any reconfiguration of the uplink receiver of this active cell. However, some changes may be needed in receiver configuration for some active cell, such as e.g. that the serving cell should be configured to generate the precoding vector for a UE in CLAS/CLBF mode.

UL MIMO in WCDMA-HSPA

The Uplink Multiple Input Multiple Output technology (UL MIMO) is another advanced technology to improve the uplink data rate. With UL MIMO, the UE can transmit either a single data stream or dual data streams in the uplink.

For LTE, UL MIMO for up to 4 TX antennas in the UE is being specified [3]. For WCDMA-HSPA, UL beam-forming has not been standardized and there is no hardware update for a ULBF UE to support UL MIMO. In a typical WCDMA-HSPA Node B, there are two receive antennas. In the future, network deployments with more receive antennas and more advanced receiver structures may become increasingly common. This means that there can be even larger gain from UL MIMO in future network deployments.

A UE which is capable of UL MIMO can be configured in: default, OLTD (OLAS or OLBF), CLTD (CLAS or CLBF), and UL MIMO (single-stream or dual-stream MIMO) mode. The characteristics of data reception and decoding for signals received from an "UL MIMO UE" is similar to that of a "CLTD UE", when the transmit mode of the UL MIMO UE is changed within the modes: default, OLAS, OLBF, CLAS and CLBF. When the primary DPCCH is pre-coded with the same pre-coding vector as the primary data stream and the secondary DPCCH is pre-coded with the same pre-coding vector as the secondary data stream in UL dual-stream MIMO mode, a cell in the active set can decode at least the primary data stream based on the estimated channel of the primary DPCCH, given that the primary DPCCH configuration is not changed at any transmit mode change. However, in order to generate the pre-coding vector for a UE in any of the modes CLAS, CLBF, UL single-stream MIMO or dual-stream MIMO, the serving cell should be configured accordingly. When a UE is configured to dual stream MIMO mode from any other transmit mode, the receiver of a cell in the active set should be configured for dual-stream MIMO mode in order to be able to decode both data streams. The mode "single stream MIMO" can be equivalent to the mode "CLBF".

UE Transmit Mode Configuration

It can be foreseen that the UE transmit mode configuration in a WCDMA system could and would be controlled by the RNC (Radio Network Controller). Reasons for this is that the RNC typically has access to information on the capabilities of both the UE and the serving Node B, the non-serving Node Bs, and other neighboring nodes. One example of such information which is valuable is whether the non-serving Node B is UL CLTD/MIMO-capable or not. Further, the RNC has access to measurement reports from both the serving Node B and non-serving Node Bs. Further, the RNC can notify both the serving Node B and the non-serving Node Bs of the currently configured transmit diversity mode of a specific UE.

Having access to the information described above, the RNC can configure the UE in a proper TD (Transmit Diversity) mode, e.g. for achieving a smooth/seamless handover, when a UE is to be handed over between an UL CLTD/MIMO-capable Node B and a legacy Node B, which is not UL CLTD/MIMO-capable. Further, the RNC can also configure the UE in a proper TD mode, based on e.g. i) the UE capability, ii) the capabilities of the serving and non-serving Node Bs and iii) the uplink measurements, in order to improve the overall system performance. A signaling scheme illustrating an RNC controlled transmit mode configuration of a UE is shown in FIG. 2.

However, it is realized that a UE TD mode control based only on the previously listed information and considerations will not be able to adapt adequately to certain changes, e.g. fast changes in uplink traffic load, since the RNC does not have access to such information.

SUMMARY

It would be desirable to enable an efficient adaptation of the transmit diversity mode of a UE. It is an object of the invention to enable an efficient adaptation of the transmit diversity mode of a UE. Further, it is an object of the invention to provide methods and arrangements for enabling a UE transmit diversity mode adaptation, which is performed by and coordinated between a control node and a BS, e.g. an RNC and a Node B in a WCDMA-HSPA system. These objects may be met by a method and arrangement according to the attached independent claims. Embodiments are defined by the dependent claims.

According to a first aspect, a method is provided in a cellular communication network comprising a control node, a mobile terminal and a BS associated with the mobile terminal. The BS may be the BS serving the mobile terminal or a non-serving BS in the active set or a corresponding set. The method involves the control node indicating a set of allowed transmit diversity modes to the BS. Further, a transmit diversity mode for the mobile terminal is selected in the BS, from amongst the currently allowed transmit diversity modes; where the selection is based on information concerning the mobile terminal, which is available in the BS. The BS then indicates the selected transmit diversity mode to the mobile terminal, which changes to the transmit diversity mode indicated by the BS.

According to a second aspect, an arrangement is provided in a cellular communication network. The arrangement comprises a control node, which is adapted to determine a set of allowed transmit diversity modes, out of a number of possible transmit diversity modes, that a BS is allowed to select for a mobile terminal. The control node is further adapted to indicate the allowed transmit diversity modes to the BS. The arrangement further comprises a BS, which is adapted to select a transmit diversity mode for a mobile terminal from amongst the currently allowed transmit diversity modes, based on information concerning the mobile terminal, available in the BS. The BS is further adapted to indicate the selected transmit diversity mode to the mobile terminal. The arrangement further comprises a mobile terminal, which is adapted to change to a transmit diversity mode, selected and indicated by the BS.

The six different aspects described below refer to methods and arrangements in the respective different nodes involved in the method and arrangement described above.

According to a third aspect, a method is provided in a BS associated with a mobile terminal. The method involves obtaining information related to a set of transmit diversity modes that are currently allowed for the mobile terminal. The method further involves selecting a transmit diversity mode for the mobile terminal from amongst the currently allowed transmit diversity modes, based on information concerning the mobile terminal, which is available in the BS. The method further involves indicating the selected transmit diversity mode to the mobile terminal.

According to a fourth aspect, an arrangement is provided in a BS adapted to be associated with a mobile terminal. The arrangement comprises a functional unit, which is adapted to obtain information related to a set of transmit diversity modes that are currently allowed for the mobile terminal. The arrangement further comprises a functional unit, which is adapted to select a transmit diversity mode for the mobile terminal from amongst the currently allowed transmit diversity modes, based on information concerning the mobile terminal, available in the BS. The arrangement further comprises a functional unit, which is adapted to indicate the selected transmit diversity mode to the mobile terminal.

According to a fifth aspect, a method is provided in a mobile terminal being associated with a BS. The method involves receiving an indication from the BS of a transmit diversity mode, which is selected by said BS from a set of currently allowed transmit diversity modes. The method further involves changing to the transmit diversity mode indicated by the BS.

According to a sixth aspect, an arrangement is provided in a mobile terminal. The arrangement comprises a functional unit, adapted to receive an indication from a BS of a transmit diversity mode selected for the mobile terminal by said BS from a set of currently allowed transmit diversity modes. The arrangement further comprises a functional unit, adapted to change to the transmit diversity mode indicated by the BS.

According to a seventh aspect, a method is provided in a control node connected to a BS associated with a mobile terminal. The method involves determining a set of allowed transmit diversity modes out of a number of possible transmit diversity modes supported by both the BS and the mobile terminal. The method further involves indicating the set of allowed transmit diversity modes to the BS.

According to an eight aspect, an arrangement is provided in a control node adapted to be connected to a BS associated with a mobile terminal. The arrangement comprises a functional unit, which is adapted to determine, out of a number of possible transmit diversity modes, a set of allowed transmit diversity modes, from which the BS is allowed to select a transmit diversity mode for the mobile terminal. The arrangement further comprises a functional unit, which is adapted to indicate the set of allowed transmit diversity modes to the BS.

The above methods and arrangements enable a fast and flexible UE transmit diversity mode adaptation. By use of the above methods and arrangements, a BS and a control node may cooperate in adapting the transmit diversity mode of a UE to the currently most appropriate one amongst a plurality of allowed alternative transmit diversity modes, according to some criteria, such as e.g. resource utilization efficiency.

The above methods and arrangements may be implemented in different embodiments. In some embodiments the selected transmit diversity mode is indicated to the mobile terminal via a predefined Layer 1 High Speed-Shared Control Channel (HS-SCCH) order. Alternatively, the selected transmit diversity mode is indicated to the mobile terminal by a predefined setting in a Layer 2 Media Access Control (MAC) header.

In some embodiments, the mobile terminal may send an acknowledgement to the BS confirming the change of transmit diversity mode. Further, the BS may inform the control node of the transmit diversity mode selected for the mobile terminal, and/or that the mobile terminal has changed to a certain transmit diversity mode. These features would e.g. increase the knowledge in the BS and control node of the current transmit diversity mode of the mobile terminal.

Further, the number and/or structure of control channels between the BS and the mobile terminal may be adapted in accordance with a change of transmit diversity mode of the mobile terminal. The BS may send a transmit mode change request to the control node when a currently preferred transmit diversity mode is not comprised in the set of allowed transmit diversity modes.

The different features of the exemplary embodiments above may be combined in different ways according to need, requirements or preference.

The above exemplary embodiments have basically been described in terms of a method. However, the described arrangements have corresponding embodiments. A computer program and a computer program product are also disclosed.

BRIEF DESCRIPTION OF THE DRAWINGS

The invention will now be described in more detail by means of exemplary embodiments and with reference to the accompanying drawings, in which.

DETAILED DESCRIPTION

Briefly described, a process for achieving coordinated UE transmit mode configuration between a base station and a control node is provided, which process is applicable when the number of supported alternative transmit diversity modes is relatively large.

Hereinafter, it is assumed that UL MIMO mode is more advanced than CLTD mode, CLTD mode is more advanced than OLTD mode and OLTD mode is more advanced than "default transmit mode". The term "default transmit mode" is used as referring to that the UE transmits from one fixed antenna, i.e. no antenna switching or other form of transmit antenna diversity is applied.

The term 'data receiving compatibility' which is used in this disclosure is defined as: Two transmit modes are compatible in data receiving if the receiver configured for one of the transmit modes can decode the data which is transmitted in the other transmit mode.

"Transmit diversity mode", "TD mode" and "transmit mode" are used interchangeably within this disclosure, and may refer to the transmit modes of both ULTD and UL MIMO Some Possible Solutions One solution to the problem of achieving adequate UE TD mode adaptation in e.g. WCDMA-HSPA, would be to provide information on the UE, which is normally only available in the Node B, to the RNC 3:2, which then would have access to all information necessary to make well-founded decisions of which transmit diversity mode a UE should be configured to. However, an RNC may be connected to hundreds of Node Bs, which in turn could serve thousands of UEs. This implies that the RNC would have to handle information on all these UEs, which would be a quite demanding task. The adaptation entailing such a solution would not be very fast.

Figure 1:
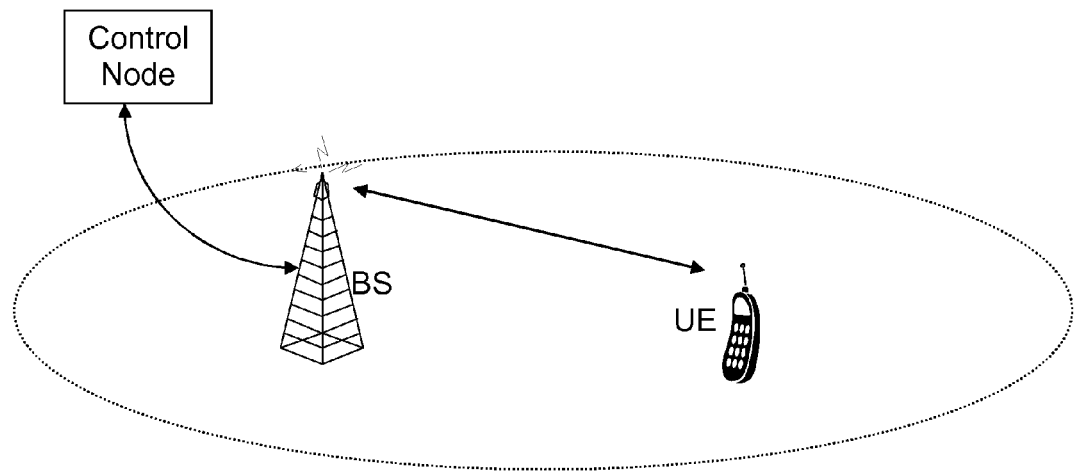
FIG. 1 is a schematic view illustrating a cellular communication network, comprising a control node, a mobile terminal and a BS serving the mobile terminal.
Figure 2:
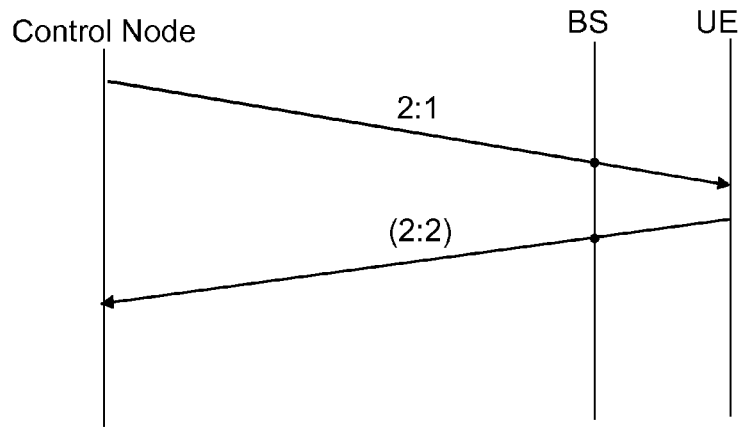
FIG. 2 is a signaling scheme illustrating the signaling when a control node configures a mobile terminal to a transmit mode, according to the prior art.
Figure 3:
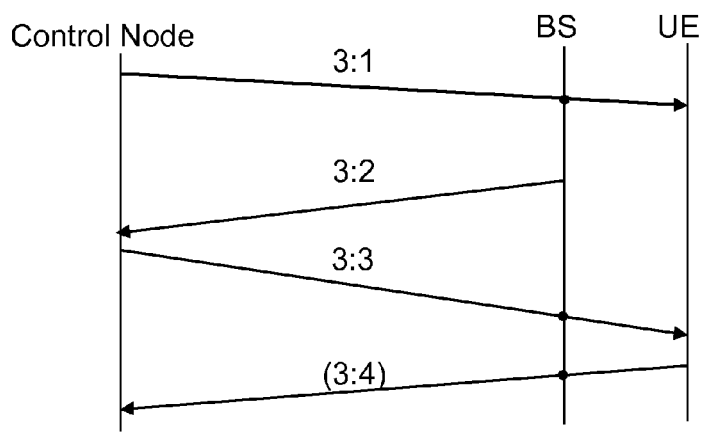
FIG. 3 is a signaling scheme illustrating the signaling when a BS requests that the transmit mode of a mobile terminal should be changed by a control node.

Further, or alternatively, the Node B could be enabled to send transmit mode change requests 3:2 related to a UE to the RNC, which then could carry out the transmit mode change 3:3 of the UE, if appropriate. This and the previous scenario are illustrated in form of a signaling scheme in FIG. 3.

Another solution would be to enable the Node B alone to control the transmit mode of a UE. The Node B has access to detailed information on UEs, which may be of value e.g. when estimating uplink performance for different alternative transmit diversity techniques. It is realized that allowing the Node B to control the transmit mode of a UE, instead of the RNC, has the following merits:

The Node B has access to scheduling information reported from the UE. This information includes the UE Power Headroom (UPH) and the UE buffer occupancy. The UPH is defined as the total available UE TX power relative to the DPCCH TX power.

The Node B has knowledge of the uplink load situation. The uplink load can vary fast due to the oscillation of intra-cell and inter-cell interference.

The Node B adjusts the granted bit-rate of UEs, according to the rate request from the UEs. For example, when a streaming UE demands a higher bit-rate, but there is no available uplink scheduling headroom, the Node B can reduce the granted bit-rate of best-effort UEs and increase the granted bit-rate of the streaming UE.

The Node B can select the transmit mode for a UE with the assistance of information on the characteristics of the uplink channel. For instance, when there is only a line of sight channel between the serving Node B and the UE, the UE should not be configured in UL MIMO mode.

The delay of a transmit mode change for a UE executed by the Node B is shorter than the delay when the change is executed by the RNC.

This solution seems attractive and would entail a fast adaptation of the transmit mode of a UE. However, handover situations would still require communication via the RNC. Further, the Node B would not be able to determine what UE transmit diversity mode that would be best for the overall system performance. These objections are also true for the case the Node B would be allowed e.g. to switch on and off dual-stream transmission in accordance with UE conditions. Further, such switching on and off would not be sufficient for efficiently selecting an appropriate transmit diversity mode when the number of supported alternative transmit diversity modes increases.

It is realized that a solution in which the RNC and Node B cooperated in determining to which transmit mode a UE should be configured, would be beneficial. A concept of such a cooperative approach will be described below. Since the cooperative approach also is applicable to other systems/technologies than WCDMA-HSPA, it will be described in a more general terminology. In the examples below it is assumed that a serving BS selects a transmit diversity mode for a UE. Alternatively, it could be another BS, which is associated with the UE, that selects a transmit diversity mode for the UE. For example, another BS in the active set.

Coordinated Transmit Mode Adaptation

Figure 4A:
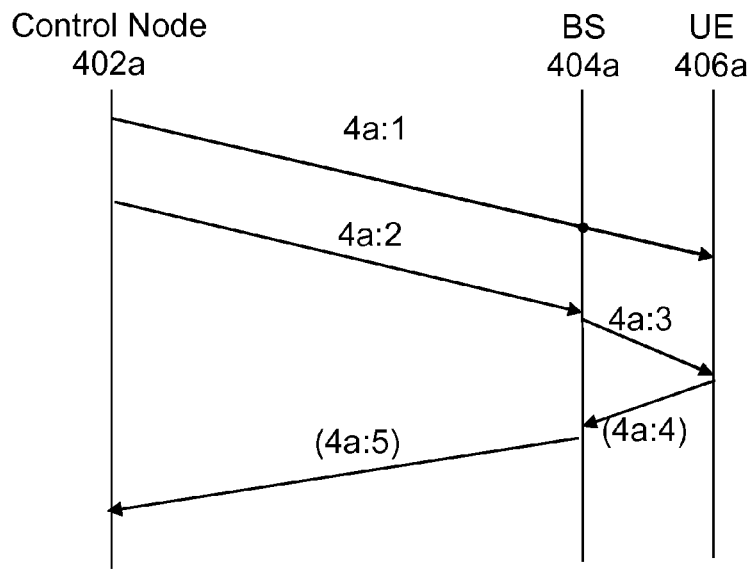
FIGS. 4a-b are signaling schemes illustrating the signaling when a BS is enabled to change the transmit mode of a mobile terminal, according to different exemplary embodiments.

An example of a signaling scheme of a coordinated transmit mode adaptation scenario is illustrated in FIG. 4a. A control node 402a, e.g. an RNC, configures 4a:1 a UE 406a to a certain transmit diversity mode. The control node further indicates 4a:2 a set of allowed TD modes from which the serving BS 404a is allowed to select a TD mode for the UE. The serving BS selects a TD mode for the UE, and indicates 4a:3 this selected mode to the UE. The UE may acknowledge the indication or order 4a:3 by an optional acknowledgement or similar, 4a:4. The acknowledgement 4a4 may be transmitted, e.g. when the indication or order 4a:3 is received, or when the transmit diversity mode of the UE is changed to the indicated mode. The serving BS may report 4a:5 the selected or currently applied UE transmit diversity mode to the control node.

Having access to a priority order, or similar, of a number of allowed transmit modes, a serving BS can determine or select the preferred UE transmit modes according, e.g. to a predefined policy. Two examples of such policies are described below. In practice, the policy to determine the preferred transmit mode for a UE can be either pre-determined or configured e.g. by a control node.

The selection of a preferred transmit diversity mode for a UE may depend on whether the UE is in soft handover (SHO) or not. When a UE is to enter SHO, it is desirable that the BS to which the UE is to be handed over is capable of receiving the transmissions from the UE in an appropriate way. For example, a UE may be handed over from a serving BS supporting UL MIMO to another BS, which does not support UL MIMO, or expects the UE to transmit using e.g. default transmit mode, or similar. Thus, when the UE is to enter SHO, the transmit diversity mode of the UE should be compatible with the capability or expectations of the BS to which the UE is to be handed over. This will be discussed in more detail further below.

Coordinated Fallback Transmit Mode Adaptation

Fallback transmit mode adaptation, is an example of a policy for how to select a TD mode for a UE in a BS, and refers to when the serving BS only is allowed to reconfigure a UE to a less advanced transmit mode than, or, to restore the transmit mode of the UE to the transmit mode most recently configured by the control node. This example policy may include the rules listed below:

When a UE is in SHO, the serving BS is allowed to configure this UE to any transmit mode that is less advanced than, but compatible in data receiving with, the transmit mode, which was most recently configured for the UE by the control node. This is to ensure the SHO gain and seamless connectivity. A table of data receiving compatibility of different transmit modes could be provided to and/or be stored in the BS. For example, the BS may be allowed to configure a UE from dual-stream MIMO mode, that is most recently configured for the UE by the control node, to CLTD (or single-stream MIMO) mode, if these modes are compatible in terms of reception.

When a UE is not in SHO, the UE TD mode may be configured in one of at least two different ways:

a) the serving BS is allowed to configure the UE to any transmit mode that is less advanced than, but compatible in data receiving with, the transmit mode configured by the control node.

b) the serving BS is allowed to configure the UE to any transmit mode that is less advanced than the transmit mode most recently configured by the control node regardless of the data receiving compatibility. This alternative enables pursuing the gain from the most preferable transmit modes.

When a UE not in SHO enters SHO, the serving BS should, when relevant, restore the UE to the transmit mode that was most recently configured by the control node or adapt the transmit mode of the UE to a less advanced transmit mode that is compatible in data receiving with the transmit mode most recently configured for the UE by the control node. This is relevant when the TD mode is adapted by the serving BS to a mode which is not compatible in data receiving with the transmit mode most recently configured for the UE by the control node.

Figure 4B:
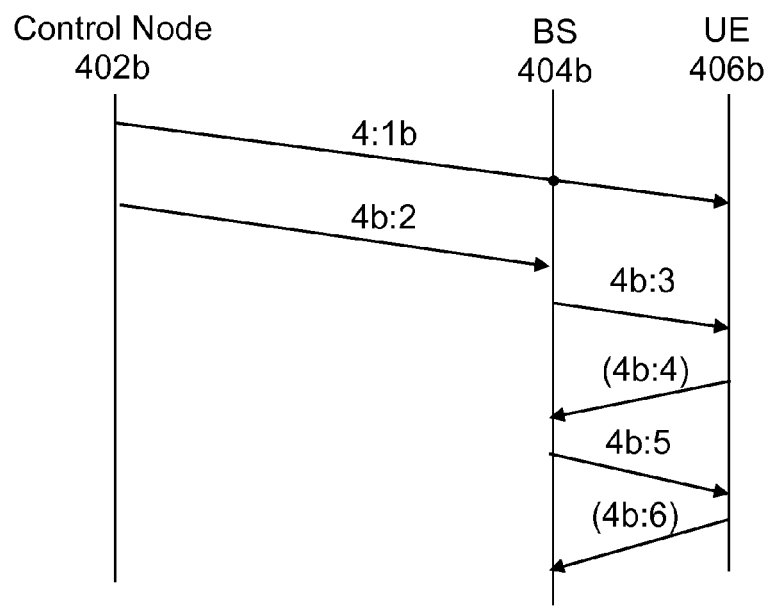

If the transmit mode, which was most recently configured for the UE by the control node e.g. is set to be higher prioritized than the transmit mode that is currently configured for the UE by the serving BS, the serving BS can restore the UE to the transmit mode most recently configured for the UE by the control node. An example illustrating this is shown in FIG. 4*b*. If the control node 402*b* has configured 4*b*:1 the UE 406*b* in e.g. UL-MIMO mode and the BS 404*b* has "reconfigured"

4*b*:3 the UE so that it instead uses CLBF (but without informing the control node); the BS can "reconfigure" 4*b*:5 the UE again so that it utilizes UL MIMO, e.g., if certain conditions have changed, and/or if the UL MIMO mode has been given a higher priority since the reconfiguration 4*b*:3.

The serving BS is not allowed to configure the UE to a more advanced transmit mode than the transmit mode most recently configured for the UE by the control node. For example, if the control node configures the UE to UL CLTD mode, the transmit mode associated with the UE cannot be changed to UL MIMO mode by the BS. In this case, the BS may instead send a transmit mode change request to the control node, e.g., via Iub/Iur signaling, and the control node can then determine whether to reconfigure the transmit mode for this UE. This would require the introduction of a new Iub/Iur signaling regarding signaling of the transmit mode change request.

When the transmit mode of a UE in SHO is changed by the control node, the UE should immediately turn to the new transmit mode configured by the control node. Then the serving BS may adapt the transmit mode of the UE in accordance with the transmit mode newly configured for the UE by the control node.

A table of data receiving compatibility of different transmit modes could e.g. be provided to and/or be stored in the BS. In this policy, it does not need to be mandatory for a UE in SHO to notify the control node or non-serving BSs about transmit mode changes of the UE induced by the serving BS, since data and control signals can still be decoded by the non-serving BSs after such a change of transmit mode.

Coordinated Flexible Transmit Mode Adaptation

With this policy the serving BS is allowed to configure a UE to a more advanced transmit mode than the transmit mode configured by the control node. Rules related to this policy may include:

When a UE is not in SHO, the serving BS can configure the UE in any transmit mode according the capability of the UE, i.e. no consideration must be taken to the data receiving compatibility amongst different transmit modes. In this case, it is not necessary to involve the control node during the transmit mode change of a UE.

When a UE not in SHO enters SHO, the serving BS should, when relevant, restore the UE to the transmit mode that was most recently configured for the UE by the control node or adapt the transmit mode of the UE to a less advanced transmit mode than the mode most recently configured for the UE by the control node, that is compatible in data receiving with said mode configured by the control node. This is relevant when the transmit diversity mode is adapted by the serving BS to a mode which is not compatible in data receiving with the transmit mode most recently configured for the UE by the control node.

When a UE is in SHO, the serving BS is only allowed to configure the UE to a transmit mode that is compatible in terms of data reception with respect to the transmit mode most recently configured for the UE by the control node. When it is determined in the serving BS, that a currently preferred transmit diversity mode is not compatible in data receiving with the transmit mode most recently configured for the UE by the control node, and thus is not selectable when the UE is in SHO, this may be handled in different ways. Two examples of methods to handle this are listed below:

Example 1: The serving BS sends a transmit mode change request to the control node, and requests a change to a desired transmit mode. The control node then makes a decision whether to reconfigure the transmit mode of the UE to the requested mode. This example method would require the introduction of a new Iub/Iur signaling regarding signaling of the transmit mode change request.

Example 2: The serving BS selects the highest prioritized transmit mode among the transmit modes that are compatible in terms of data reception with the transmit mode most recently configured for the UE by the control node. The serving BS may also notify the control node about the transmit mode change of the UE. In this example it is not necessary to introduce new signaling of a transmit mode change request.

When the transmit mode of a UE in SHO is changed by the control node, the UE should immediately turn to the new transmit mode configured by the control node. Then, the serving BS may adapt the transmit mode of the UE in accordance with the transmit mode newly configured for the UE by the control node.

A table of data receiving compatibility of different transmit modes could e.g. be provided to and/or be stored in the BS. Regardless of whether the UE is in SHO, the UE transmit mode selected by the BS, or control node, should be one which is supported by the UE.

Figure 5:
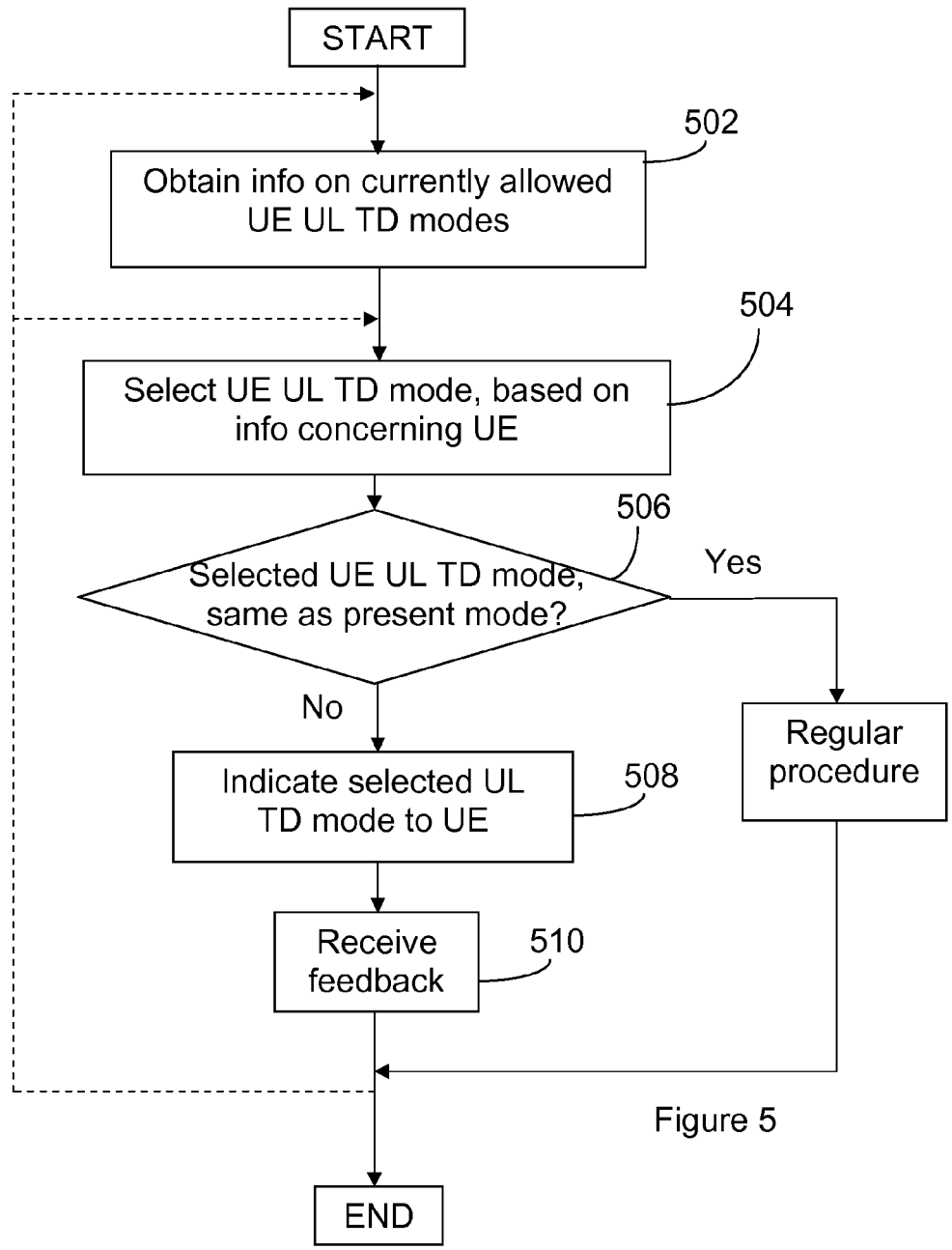
FIGS. 5 is a flow chart illustrating a procedure for coordinated transmit mode adaptation in a BS, according to an embodiment.

Example Procedure in Base Station, FIG. 5

An embodiment of the part of the procedure of coordinated transmit mode adaptation which is performed in a BS will now be described with reference to FIG. 5. The BS is assumed to be serving a mobile terminal in a cellular communication network which further comprises a control node connected to the BS. Note that, as previously described, it could alternatively be another BS associated with the mobile terminal that interacts with the control node and mobile terminal, such as a non-serving BS in the active set of the mobile terminal. This applies to all embodiments.

Initially, information related to a set of transmit diversity modes that are currently allowed for the mobile terminal is obtained in an action 502. The information could e.g. be received from the control node in different ways, either explicitly or implicitly, or the information could e.g. be previously received or agreed and be retained and retrieved from a memory within the BS, or be requested from another node. A transmit diversity mode is selected for the mobile terminal from amongst the currently allowed transmit diversity modes in an action 504. The selection is based on information concerning the mobile terminal, which information is available in the BS. The information would typically be e.g. the cell load, the UPH, the mobile terminal transmit buffer status, the instantaneous required bit-rate of a mobile terminal, the uplink channel characteristics associated with a mobile terminal, the granted bit-rate adjustment according to the scheduling priority between users and antenna imbalance. The selected transmit diversity mode is then indicated to the mobile terminal in an action 508. The indication could e.g. be in the form of a HS-SCCH order or as a predefined setting in a Layer 2 MAC header. HS-SCCH orders may be sent to a mobile terminal from a serving BS and non-serving BSs in the active set of the mobile terminal.

When necessary or preferred, it could be evaluated whether there actually is a more adequate or favorable TD mode than the currently used, e.g. by a simple test as the one illustrated as action 506. This could avoid e.g. unnecessary indications from the BS or evaluation in the mobile terminal of whether the indication indicates the currently used TD mode.

When mobile terminals may be configured to send an acknowledgement when the indication is received and/or the change of TD mode is executed, such an acknowledgement may be received in an action 510. The procedure may further comprise an action where a transmit mode change request is transmitted to the control node, e.g. when a preferred transmit diversity mode is not comprised in the set of allowed transmit diversity modes.

The procedure may also comprise adapting the number and/or structure of control channels between the BS and the mobile terminal in accordance with the selected transmit diversity mode. For example, adding a DPCCH and/or using a specific channelization code for a DPCCH.

After the final action, the procedure could end, or return to action 502 or 504, which is illustrated by dashed arrows in FIG. 5.

Figure 6:
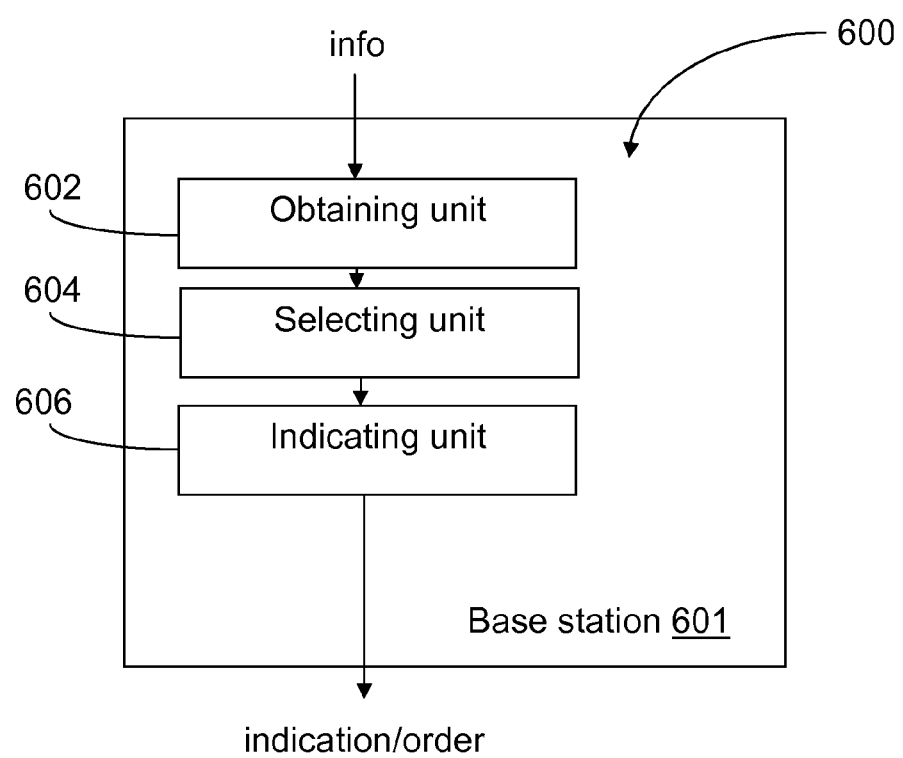
FIG. 6 is a block diagram illustrating an arrangement adapted for coordinated transmit mode adaptation in a BS, according to an exemplary embodiment.

Example Arrangement in Base Station, FIG. 6

Below, an exemplary arrangement 600, adapted to enable the performance of the above described procedure of coordinated transmit mode adaptation performed in a BS, will be described with reference to FIG. 6. The arrangement is illustrated as located in a BS 601, which could be e.g. a WCDMA Node B. The arrangement 600 comprises an obtaining unit 602, which is adapted to obtain information related to a set of transmit diversity modes that are currently allowed for a mobile terminal served by the BS. The information could e.g. be received from a control node, e.g. a WCDMA RNC, in different ways, either explicitly or implicitly, or, the information could e.g. be previously received or agreed and be retained and retrieved from a memory within the BS, or be requested from another node.

The arrangement 600 further comprises a selecting unit 604, which is adapted to select a transmit diversity mode for the mobile terminal from amongst the currently allowed transmit diversity modes, based on information concerning the mobile terminal, which information is available in the BS. As previously described, this information could be at least one of: the cell load, the UPH, the mobile terminal transmit buffer status, the instantaneous required bit-rate of a mobile terminal, the uplink channel characteristics associated with a mobile terminal, the granted bit-rate adjustment according to the scheduling priority between users and antenna imbalance. The arrangement 600 further comprises an indicating unit 606, which is adapted to indicate the selected transmit diversity mode to the mobile terminal, e.g. as a HS-SCCH order or a predefined setting in a MAC header.

The arrangement may further be adapted to or comprise further functional unit(s) which could be adapted to evaluate whether there actually is a more adequate or favorable TD mode than the currently used. This could avoid e.g. unnecessary indications from the BS and/or evaluation in the mobile terminal of whether the indication indicates the currently used TD mode.

The arrangement may further be adapted to or comprise further functional unit(s) which could be adapted to receive acknowledgements sent from the mobile terminal when the indication is received and/or the change of TD mode is executed by the UE. The arrangement 600 may further comprise a functional unit, which is adapted to send a transmit mode change request to the control node when a currently preferred transmit diversity mode is not comprised in the set of allowed transmit diversity modes, and the BS thus is not allowed to trigger such a transmit mode change to the mobile terminal directly. The possibility of requesting a transmit mode change to the control node could be beneficial, e.g. in association with a handover, as previously described.

The arrangement 600 may further comprise a functional unit, which is adapted to adapt the number of control channels between the BS and the mobile terminal in accordance with the selected transmit diversity mode and the change of transmit diversity mode of the mobile terminal.

Figure 7:
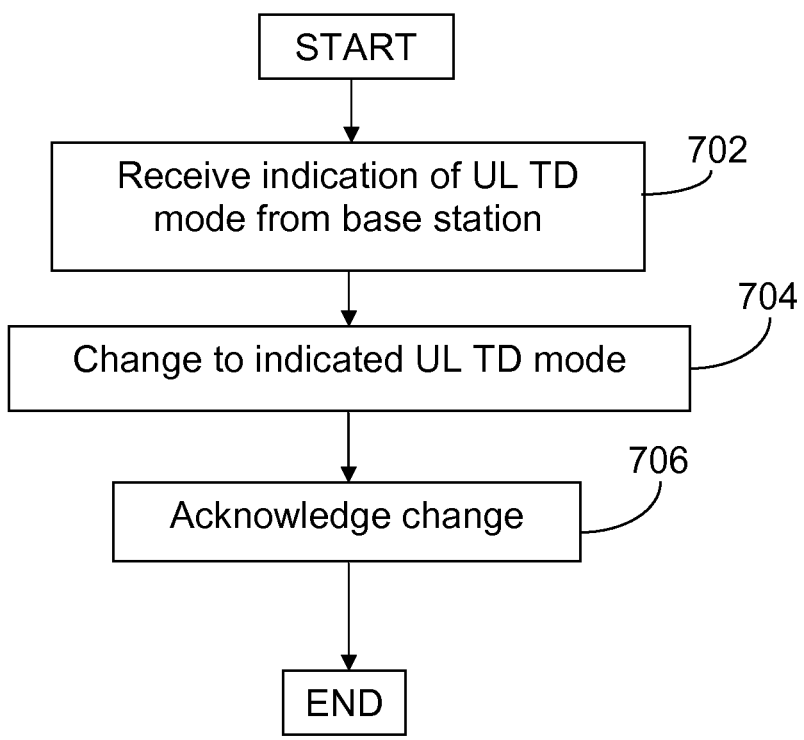
FIG. 7 is a flow chart illustrating a procedure for coordinated transmit mode adaptation in a mobile terminal, according to an embodiment.

Example procedure in mobile terminal, FIG. 7

An embodiment of the part of the procedure of coordinated transmit mode adaptation performed in a mobile terminal will now be described with reference to FIG. 7. The mobile terminal, e.g. denoted UE, is assumed to be served by a BS, e.g. a WCDMA Node B in a cellular communication network which further comprises a control node, e.g. a WCDMA RNC, connected to the BS.

Initially, an indication from the serving BS is received in an action 702. The indication indicates a transmit diversity mode, which is selected by the serving BS from a set of currently allowed transmit diversity modes. The indication may be received e.g. in the form of a HS-SCCH order or as a predefined setting in a Layer 2 MAC header.

The transmit diversity mode of the mobile terminal is changed to the transmit diversity mode indicated by the serving BS, in an action 704. Further, in some embodiments, the mobile terminal may be configured to send an acknowledgement to the BS when the indication has been received and/or the change of mobile terminal TD mode is executed. This is illustrated in FIG. 7 by an action 706.

Figure 8:
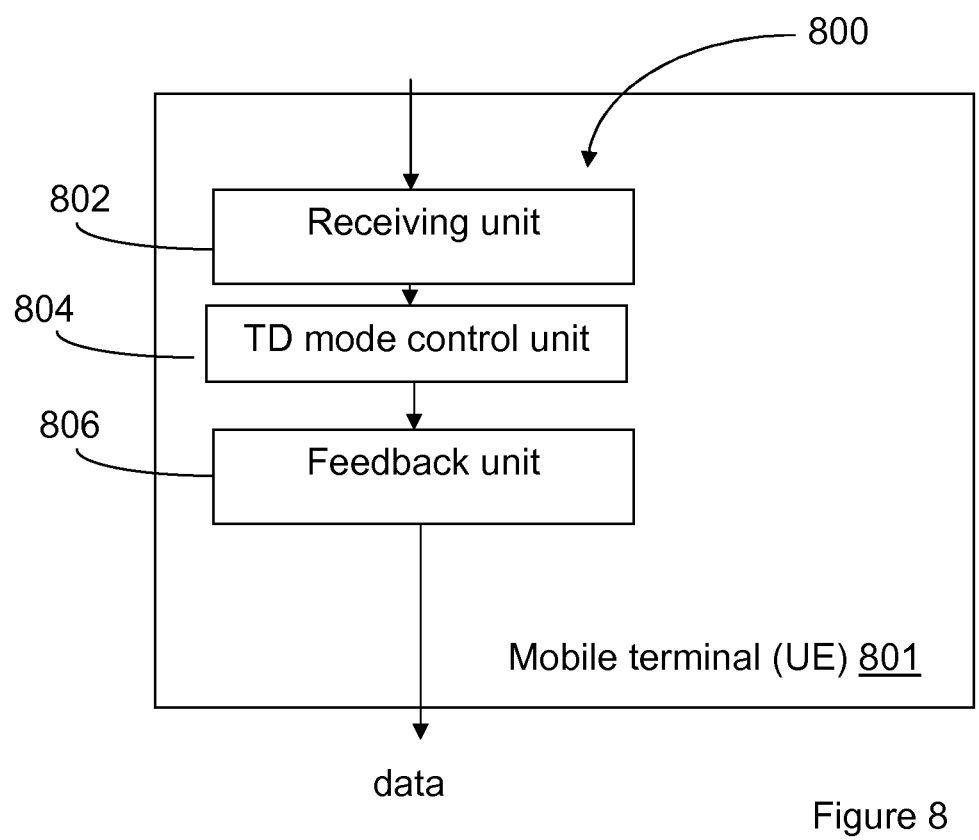
FIG. 8 is a block diagram illustrating an arrangement adapted for coordinated transmit mode adaptation in a mobile terminal, according to an exemplary embodiment.

Example arrangement in mobile terminal, FIG. 8

Below, an exemplary arrangement 800, adapted to enable the performance of the above described procedure of coordinated transmit mode adaptation performed in a mobile terminal, will be described with reference to FIG. 8. The arrangement is illustrated as located in a mobile terminal 801, which could be e.g. a UE adapted to function according to the WCDMA standard.

The arrangement 800 comprises a receiving unit 802, which is adapted to receive an indication from a serving BS of a transmit diversity mode, which is selected by the serving BS from a set of currently allowed transmit diversity modes. The arrangement 800 further comprises a transmit diversity mode control unit 804, which is adapted to change the transmit diversity mode of the mobile terminal to the transmit diversity mode indicated by the serving BS.

The arrangement 800 may further comprise a feedback unit 805, which may be adapted to confirm the reception of an indication of a transmit mode from the BS, and/or to confirm the change to the indicated transmit mode, e.g. by sending an acknowledgement to the BS.

Figure 9:
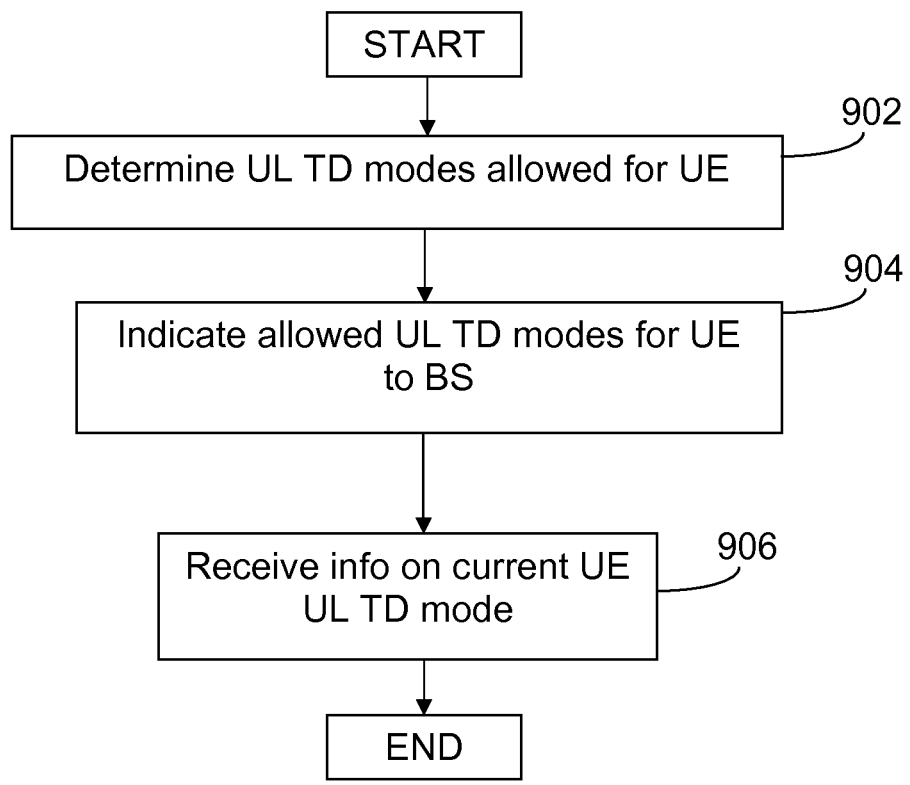
FIG. 9 is a flow chart illustrating a procedure for coordinated transmit mode adaptation in a control node, according to an exemplary embodiment.

Example Procedure in Control Node, FIG. 9

An embodiment of the part of the procedure of coordinated transmit mode adaptation, which is performed in a control node will now be described with reference to FIG. 9. The control node, e.g. a WCDMA RNC, is assumed to be connected to a BS, e.g. a WCDMA Node B in a cellular communication network further comprising a mobile terminal, e.g. a UE adapted to function according to the WCDMA standard, which mobile terminal is served by the BS.

Initially, a set of allowed transmit diversity modes out of a number of possible transmit diversity modes is determined in an action 902. The set of allowed transmit diversity modes comprises the transmit diversity modes which are allowed for the serving BS to select for the mobile terminal. The allowed transmit diversity modes could e.g. be explicitly determined as a set of specified modes or be implicitly determined e.g. by the determining of to which transmit diversity mode the mobile terminal is to be configured by the control node. In case of the latter, it could be previously agreed or configured which transmit diversity modes that are allowed, given that a certain transmit diversity mode is configured for the mobile terminal by the control node. The set may comprise e.g. two or more transmit diversity modes, other than the one configured for the mobile terminal by the control node.

The allowed transmit diversity modes are indicated to the serving BS in an action 904. The indication could be explicit e.g. in form of a list or record of allowed transmit diversity modes, or, the indication could be at least partly implicit, e.g. in form of the transmit mode to which the mobile terminal is configured by the control node In embodiments where a BS may be configured to inform the control node of mobile terminal transmit mode changes induced or ordered by the BS, such information could be received in an action 906. This information could be used for, during some conditions, trigger the configuration of a mobile terminal transmit mode, or, the information could be transferred to other nodes, such as non-serving BSs, which then would be updated e.g. on how to receive transmissions from the mobile terminal.

Further, the procedure may comprise an action where transmit mode change requests related to the mobile terminal are received from the BS, requesting the control node to change the transmit mode of the mobile terminal to a certain transmit diversity mode. The request would then have to be evaluated and an appropriate action be taken by the control node.

Figure 10:
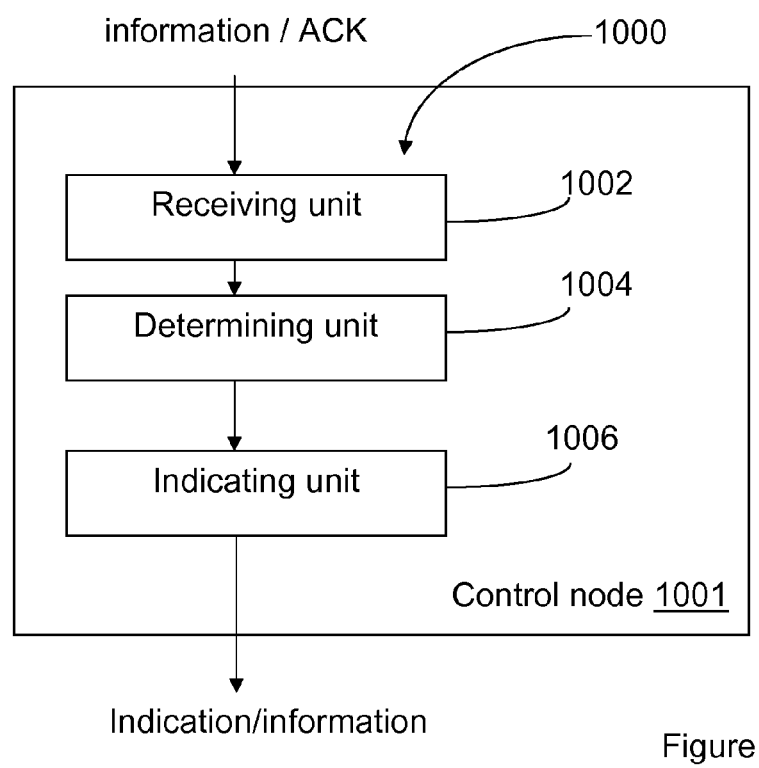
FIG. 10 is a block diagram illustrating an arrangement adapted for coordinated transmit mode adaptation in a control node, according to an exemplary embodiment.

Example Arrangement in Control Node, FIG. 10

Below, an exemplary arrangement 1000, adapted to enable the performance of the above described procedure of coordinated transmit mode adaptation performed in a control node, will be described with reference to FIG. 10. The arrangement is illustrated as located in a control node 1001, which could be e.g. a WCDMA RNC, adapted to be connected to a BS serving a mobile terminal.

The arrangement 1000 comprises a determining unit 1004, adapted to determine a set of allowed transmit diversity modes, out of a number of possible transmit diversity modes that the serving BS is allowed to select for the mobile terminal. The arrangement 1000 further comprises an indicating unit 1006, which is adapted to indicate the allowed transmit diversity modes to the serving BS. As previously described, the allowed modes could be determined explicitly or implicitly, and also be indicated to the BS explicitly or implicitly.

The arrangement 1000 may further comprise a receiving unit 1002, which is adapted to receive information from the BS concerning mobile terminal transmit mode changes induced or ordered by the BS.

The arrangement 1000 may further comprise a functional unit, which is adapted to receive a transmit mode change request from the BS, requesting the control node to change the transmit mode of the mobile terminal to a certain transmit diversity mode. A functional unit would then also need to be adapted to evaluate the received request and take an appropriate action.

Figure 11:
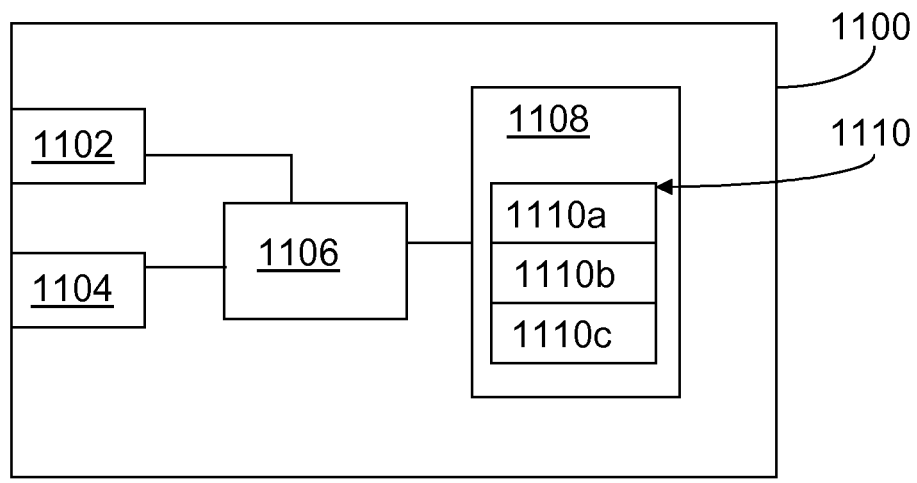
FIGS. 11-12 are alternative schematic views illustrating embodiments of a mobile terminal and BS.

Example Arrangement in Mobile Terminal, FIG. 11

FIG. 11 schematically shows an embodiment of a mobile terminal 1100, which also can be an alternative way of disclosing an embodiment of the arrangement in a mobile terminal illustrated in FIG. 8. Comprised in the mobile terminal 1100 are here a processing unit 1106, e.g. with a DSP (Digital Signal Processor) and an encoding and a decoding module. The processing unit 1106 can be a single unit or a plurality of units to perform different steps of procedures described herein. The mobile terminal 1100 also comprises the input unit 1102 for receiving signals, and the output unit 1104 for output signal(s). The input unit 1102 and the output unit 1104 may be arranged as one in the hardware of the mobile terminal.

Furthermore the mobile terminal 1100 comprises at least one computer program product 1108 in the form of a non-volatile memory, e.g. an EEPROM (Electrically Erasable Programmable Read-Only Memory), a flash memory and a disk drive. The computer program product 1108 comprises a computer program 1110, which comprises code means, which when run in the processing unit 1106 in the mobile terminal 1100 causes the mobile terminal to perform the steps of the procedures described earlier in conjunction with FIG. 7.

Hence in the exemplary embodiments described, the code means in the computer program 1110 of the mobile terminal 1100 comprises a communication module 1110a for receiving an indication of a transmit diversity mode, which is selected by the serving BS from a set of currently allowed transmit diversity modes, a TD mode control module 1110b for changing to the transmit diversity mode indicated by the serving BS, and possibly a feedback module 1110c, for acknowledging to the BS that the indication has been received and/or that the change of mobile terminal TD mode has been executed. The computer program 1110 is in the form of computer program code structured in computer program modules. The modules 1110a-c essentially perform the steps of the flows illustrated in FIG. 7, to emulate the arrangement or UE illustrated in FIG. 8. In other words, when the different modules 1110a-c are run on the processing unit 1106, they correspond to the units 802-806 of FIG. 8.

Figure 12:
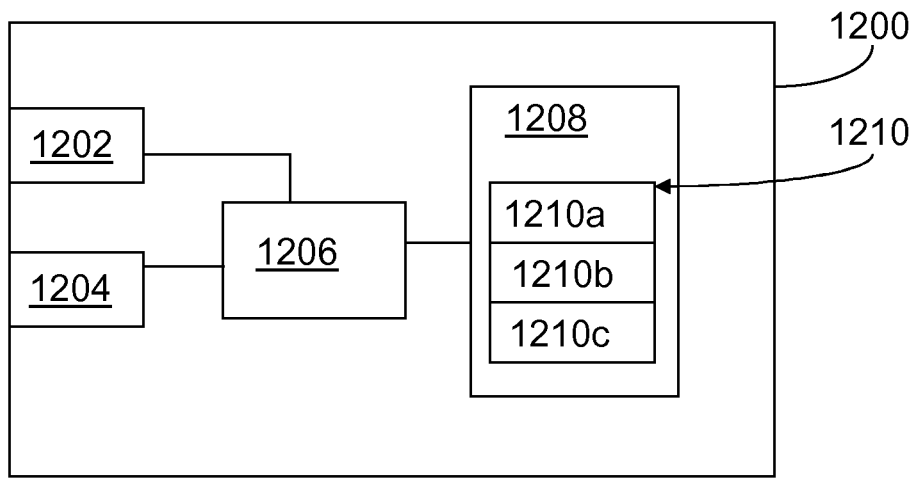

Example Arrangement in Control Node, FIG. 12

FIG. 12 schematically shows an embodiment of an arrangement 1200 in a BS, which also can be an alternative way of disclosing an embodiment of the arrangement 600 in a BS 601, illustrated in FIG. 6. Comprised in the BS 1200 are here a processing unit 1206, e.g. with a DSP and an encoding and a decoding module. The processing unit 1206 can be a single unit or a plurality of units to perform different steps of procedures described herein. The arrangement 1200 also comprises the input unit 1202 for receiving signals, and the output unit 1204 for output signal(s). The input unit 1202 and the output unit 1204 may be arranged as one in the hardware of the BS.

Furthermore the arrangement 1200 comprises at least one computer program product 1208 in the form of a non-volatile memory, e.g. an EEPROM, a flash memory and a disk drive. The computer program product 1208 comprises a computer program 1210, which comprises code means, which when run in the processing unit 1206 in the arrangement 1200 causes the arrangement and/or BS to perform the steps of the procedure described earlier in conjunction with FIG. 5.

Hence in the exemplary embodiments described, the code means in the computer program 1210 of the arrangement 1200 comprises a communication module 1210a for obtaining information related to a set of transmit diversity modes that are currently allowed for a mobile terminal served by the BS, a selecting module 1210b, for selecting a transmit diversity mode for the mobile terminal from amongst the currently allowed transmit diversity modes, and an indicating module 1210c for indicating the selected transmit diversity mode to the mobile terminal, e.g. as a HS-SCCH order. The computer program 1210 is in the form of computer program code structured in computer program modules. The modules 1210a-c essentially perform the steps of the flow illustrated in FIG. 5, to emulate the network node illustrated in FIG. 6. In other words, when the different modules 1210a-c are run on the processing unit 1206, they correspond to the units 602-606 of FIG. 6.

Although the code means in the embodiments disclosed above in conjunction with FIGS. 11 and 12 are implemented as computer program modules, which when run on the processing unit causes the mobile terminal and BS, respectively, to perform the steps described above in the conjunction with figures mentioned above, at least one of the code means may in alternative embodiments be implemented at least partly as hardware circuits.

Further, the functional modules 1100a-c and 1200a-c described above can be implemented as program modules of a computer program comprising code means, which when run by a processor in the mobile terminal and BS, respectively, causes these devices to perform the above-described functions and actions. The processor may not only be a single CPU (Central processing unit), but could comprise two or more processing units in the devices. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product in the mobile terminal or BS, respectively, connected to the processor. The computer program product comprises a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the mobile terminal and BS, respectively.

A similar alternative disclosure of an embodiment of the arrangement in a control node illustrated in FIG. 10 is considered to be disclosed herein by analogy with the arrangements described in conjunction with FIGS. 11 and 12.

Associated Radio Link Configuration for Transmit Mode Change

The different TD modes may be associated with a different number of control channels, e.g. DPCCHs. Thus, when a mobile terminal transmit mode change is induced or ordered by the serving BS, a new control channel may be required to be set up, or, it may be desired to release a control channel which is no longer needed. For example, in current WCDMA terminology, a secondary DPCCH should be setup between a serving Node B and a UE when the serving Node B induces or orders the UE to change transmit diversity mode from default mode to CLTD mode. Further, when a serving Node B orders a UE to change transmit mode from CLTD mode to default mode, a secondary DPCCH may be released. However, one control channel should be kept unchanged during the setup or release of additional control channels, i.e. the primary DPCCH should be kept unchanged.

The setup or release of an additional control channel could be processed in accordance with a UE transmit mode change induced by the serving Node B. Below, two example rules for handling the setup/release of a control channel is presented in current WCDMA terminology:

1. RNC Not Involved:
    The serving Node B sets up or releases the secondary DPCCH in accordance with a transmit mode selected for a UE, without involving the RNC. For example, a pre-defined secondary DPCCH setup/release procedure for transmit mode changes, which are induced or ordered by the serving Node B, could be specified in 3GPP. For example, the spreading code and transport format of the secondary DPCCH could be specified, and the secondary DPCCH setup/release could be done automatically in accordance with a transmit mode change. Further, the initial DPCCH power level associated at setup for the secondary DPCCH could be based on the power level of the primary DPCCH. Another example would be to define new orders targeting the secondary DPCCH setup and release between the serving Node B and UE. The secondary DPCCH setup and release between the non-serving Node B and the UE is not mandatory. With either method listed above, the setup and release procedure of the secondary DPCCH terminates between the serving Node B and UE. In this way, RNC is not involved in the setup and release of the secondary DPCCH.

2. RNC Involved:

The serving Node B reports the secondary DPCCH setup/release requirement to the RNC, and the RNC sets up/releases the secondary DPCCH by the RRC (Radio Resource Control) signaling. This would require new signaling between the Node B and RNC. A drawback with this method is that it will result in a long delay.

Implementation Issues

According to the disclosed methods above, the new signaling between control node and BS is not necessary if (in WCDMA terminology):

The serving Node B is not allowed to configure the UE to a more advanced transmit mode than the transmit mode most recently configured for the UE by the RNC, or trigger a change to a transmit mode that is not compatible in data receiving with the transmit mode most recently configured for the UE by the RNC, and The serving Node B is allowed not to report the transmit mode change of a UE triggered by the serving Node B, and The setup and release of a control channel associated with a transmit mode change triggered by the serving Node B are specified to be handled by the serving Node B without involving the RNC.

If no new signaling is introduced, a transmit mode change triggered by the serving Node B can only be applied when the transmit mode change does not require the setup or release of a control channel.

Serving Base Station-Based Prioritization of UE Transmit Modes

In order to facilitate for a serving BS to select a UE TD mode, a priority order or "ranking" of the different TD modes, e.g. during current conditions, could be produced. For example, the serving BS could prioritize amongst the transmit modes supported by a UE periodically, or when triggered by some condition. Such prioritization could be based e.g. on the detailed measurements related to the UE, which are available in the serving BS. A transmit mode which for some reason is more suitable than another transmit mode may be given a higher priority or rank. Two examples of how a BS could prioritize, or rank, transmit modes for a UE are presented below. The examples are given in WCDMA terminology.

EXAMPLE 1

In this example, the UE transmit mode prioritization by the serving Node B is based on one or more of the granted bit-rate, the UPH and the UE buffer status. The UPH and the UE buffer status are reported by the UE to the BS in the so called scheduling information to assist the EUL (Enhanced UpLink) scheduling, which is performed in the Node B. The required E-DCH (Enhanced-Dedicated CHannel) power off-set of the granted bit-rate for a UE should not exceed the reported UPH. As the DPCCH power changes fast due to various factors, e.g. DPCCH SINR target adjustment by OLPC (Open Loop Power Control), mobility, corner effects, interference oscillation, etc, the UPH of a UE changes on a short time scale. Thus, the transmit bit-rate of the UE is restricted by the instantaneous UPH.

The granted bit-rate is the maximum bit-rate that the network allows the UE to transmit in the uplink. The granted bit-rate of a UE depends on multiple factors, e.g., the available E-DCH load in the serving and non-serving cells, the scheduling priority of the particular UE, the required bit-rate of the access services associated with the UE, the scheduling policy, e.g. proportional fair or equal rate, the UE TX buffer status and the UPH.

A low UPH or a low granted bit-rate for a UE implies that the UE cannot transmit with high bit-rate in the uplink due to UE power limitations or uplink load limitations. Similarly, a low UE TX buffer level implies that the UE does not require high uplink bit-rate transmission, since it does not have much to transmit. In such low bit-rate cases, the dual-stream transmission will be inefficient due to the inter-stream interference. Hence, dual-stream MIMO mode should be down-prioritized with respect to the other transmit modes. When the UPH is extremely low, a secondary DPCCH takes a too high power overhead relative to data, as compared to the high bit-rate case. Thus, a transmit mode which requires that two DPCCHs are transmitted in the uplink should be lower prioritized. On the contrary, if the UE can transmit high enough bit-rates, the UL MIMO should be higher prioritized than CLTD, and CLTD should be higher prioritized than OLTD. In this case, the DPCCH overhead is low enough compared to the amount of transferred data, and may thus be ignored.

Figure 13:
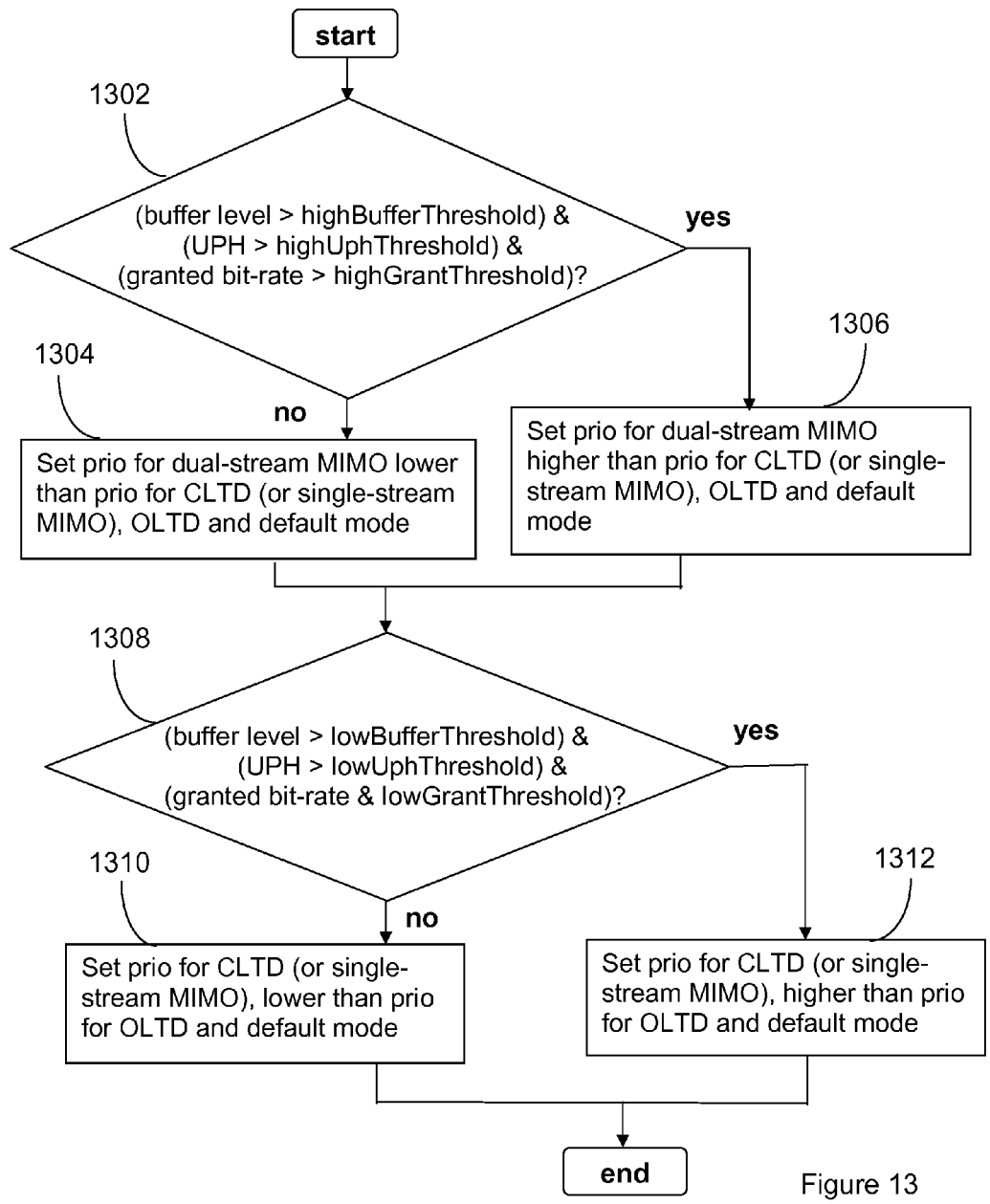
FIGS. 13-14 are flow charts illustrating different procedures for prioritization of transmit modes.

Example Prioritization Procedure, FIG. 13

A flow chart of example 1 described above is illustrated in FIG. 13. If the UPH, buffer level and granted bit-rate of a UE are higher than the pre-defined high thresholds, highUphThreshold, highBufferThreshold and highGrantThreshold respectively 1302, a UE can transmit with a high enough bit-rate that can benefit from dual-stream transmission. In this case, dual-stream MIMO should be prioritized higher than CLTD (or single-stream MIMO), OLTD and default transmit mode for this UE 1306. Otherwise, if any of UPH, buffer level and granted bit-rate of a UE is lower than the corresponding predefined high threshold, which implies that the UE cannot transmit at high bit-rate, dual-stream MIMO should be lower prioritized than CLTD (or single-stream MIMO), OLTD and default mode for this UE 1304.

Further, if the UPH, buffer level and granted bit-rate of a UE are higher than the corresponding predefined low thresholds, lowUphThreshold, lowBufferThreshold and lowGrantThreshold 1308, which imply that the UE can still benefit from the CLTD or single-stream MIMO mode even though two DPCCHs are required to be transmitted in the uplink, the CLTD (or single-stream MIMO) mode should be higher prioritized than the OLTD and default transmit mode for this UE 1312. Otherwise, if any of the UPH, buffer level and granted bit-rate of the UE are lower than the corresponding predefined low thresholds, lowUphThreshold, lowBufferThreshold and lowGrantThreshold, this implies that the UE cannot benefit from the CLTD or single-stream MIMO mode due to excessive DPCCH overhead if 2 DPCCHs are to be transmitted in the uplink, and thus the CLTD or single-stream MIMO mode should be lower prioritized than the OLTD and default transmit mode for this UE 1310.

EXAMPLE 2

UE transmit mode prioritization by the serving Node B based on the measured uplink bit-rate The UE can transmit at a much lower rate than the bit-rate granted by the serving Node B due to other restrictions. Such other restrictions include: limited amount data in the TX buffer, UE power limitation or that the serving grant of a UE is decreased by the non-serving cells using the relative grant (overload indicator).

Figure 14:
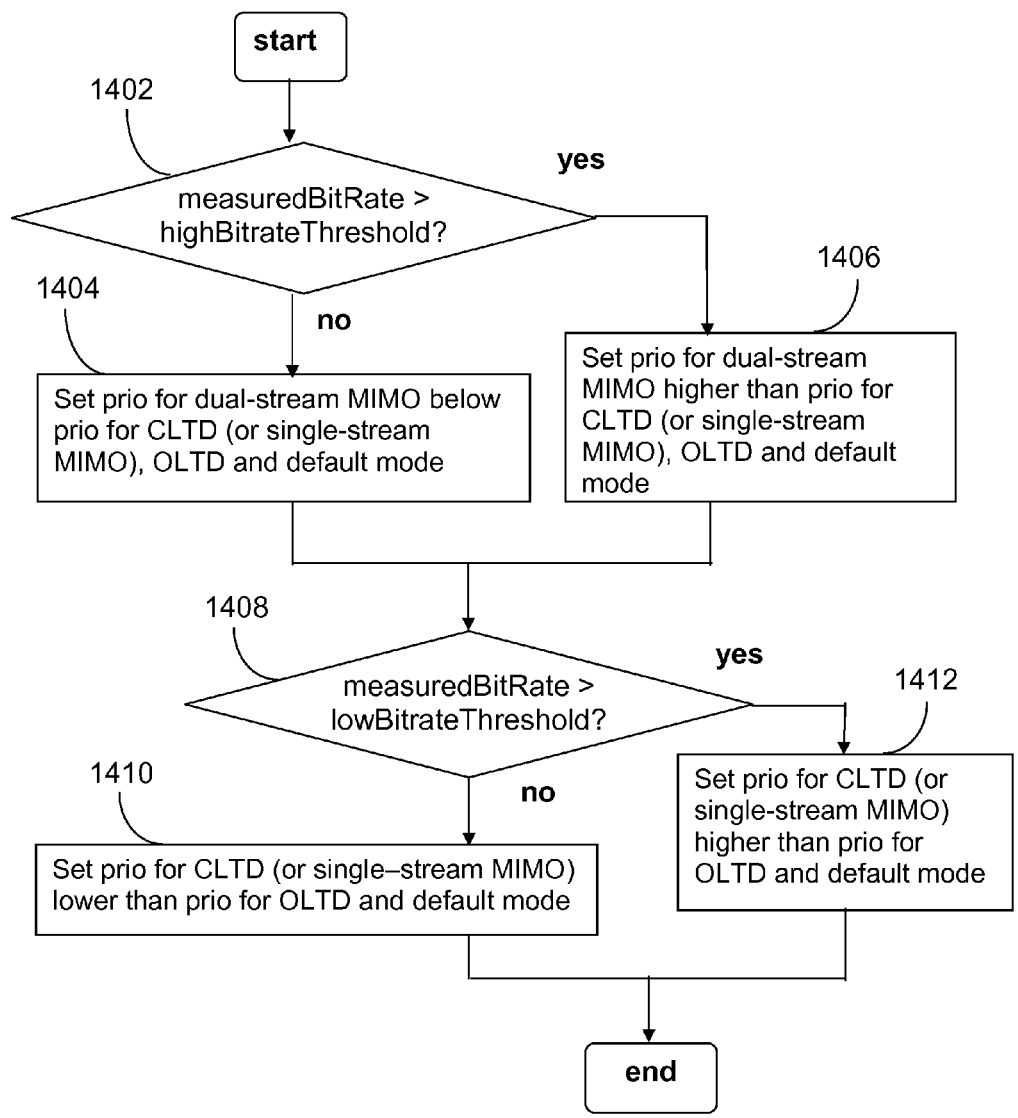

Example Prioritization Procedure, FIG. 14

A flow chart of example 2 is illustrated in FIG. 14. The serving Node B can measure the transmit bit-rate for a UE in uplink, e.g., based on the E-TFCIs (Enhanced-Transport Format Combination Indicators) carried in E-DPCCH. If the measured rate or the granted bit-rate of a UE is higher than a certain predefined high bit-rate threshold, highBitrateThreshold, 1402, this suggests that the transmit bit-rate of this UE is high enough to benefit from the dual-stream MIMO transmission, and thus the Node B prioritizes the dual-stream MIMO higher than CLTD (or single-stream MIMO), which in turn is prioritized higher than OLTD and default transmit mode 1406. If the measured rate or the granted bit-rate of a UE is lower than highBitrateThreshold, the dual-stream MIMO should be lower prioritized than CLTD (or single-stream MIMO), OLTD and default transmit mode, 1404, due to that the UE cannot benefit from the dual-stream transmission.

The measured bit-rate is further compared with a low bit-rate threshold, lowBitrateThreshold, 1408. If the measured bit-rate is higher than lowBitrateThreshold, this implies that the UE can still benefit from CLTD or single-stream MIMO mode, even though there are two DPCCHs transmitted in the uplink. Thus, the CLTD (or single-stream MIMO) should be higher prioritized than OLTD and default transmit mode 1412. Otherwise, if the measured bit-rate is lower than lowBitrateThreshold, which implies that a two-DPCCH overhead would be excessive in the uplink, the CLTD mode should be lower prioritized than OLTD and default transmit mode 1410.

The prioritization procedure for the transmit modes for a UE could be processed periodically by the serving Node B. The period can e.g. be either predefined or configured by the RNC.

Enabling the BS to select an appropriate transmit diversity mode from amongst a set of allowed transmit diversity modes and induce the UE to change to the selected transmit diversity mode, as a complement to the configurations made by the control node, ensures that the proper transmit diversity mode can be selected for a UE in a quick style.

A procedure for fast and appropriate adaptation of UE transmit diversity mode enables the improving of e.g. the uplink radio resource utilization efficiency; the UE power utilization efficiency; and the uplink coverage and bit-rate of a UE.

While the invention has been described with reference to specific example embodiments, the description is in general only intended to illustrate the inventive concept and should not be taken as limiting the scope of the invention. The different features of the exemplary embodiments above may be combined in different ways according to need, requirements or preference. The description has mainly referred to a WCDMA scenario, but the invention may also be applied in other similar systems, such as e.g. CDMA2000, where the channels and nodes, such as the RNC, Node B and UE, may be named differently, but still have the same, or a very similar, function as compared to WCDMA.

It is also to be understood that the choice of interacting units or modules, as well as the naming of the units or modules are only for exemplifying purpose, and UEs and network nodes suitable to execute any of the methods described above may be configured in a plurality of alternative ways in order to be able to execute the suggested process steps. The skilled person is free to implement the functional units described herein in practice using any suitable software and/or hardware means.

It should also be noted that the units, or modules, described in this disclosure are to be regarded as logical entities and not with necessity as separate physical entities.

ABBREVIATION LIST

3GPP 3rd Generation Partnership Project
BS Base Station
CLAS Closed Loop Antenna Switching
CLBF Closed Loop Beam Forming
CSI Channel State Information
DPCCH Dedicated Physical Control CHannel
E-DCH Enhanced Dedicated CHannel
E-TFCI E-DCH Transport Format Combination Indicator
HS-DSCH High Speed Downlink Shared Channel
HSPA High Speed Packet Access
HS-SCCH High Speed Shared Control Channel
LTE Long Term Evolution
MIMO Multiple Input Multiple Output
Node B Base station node in, for example, UTRA/WCDMA/HSPA
OLAS Open Loop Antenna Switching
OLBF Open Loop Beam Forming
RNC Radio Network Controller
RRC Radio Resource Control
SINR Signal-to-Interference-and-Noise Ratio
TPC Transmit Power Control
UE User Equipment
ULTD UpLink Transmit Diversity
UPH UE Power Headroom
WCDMA Wideband Code Division Multiple Access

REFERENCES

[1] 3GPP TR 25.863, "Uplink Tx Diversity for HSPA Study Item Technical Report".
[2] 3GPP Tdoc R1-102931, Concept of UL Closed Loop Transmit Diversity, Huawei
[3] 3GPP Tdoc RP-091430, UL multiple antenna transmission for LTE, work item, RAN#46
[4] U.S. 61/359,900, Handling of UL Transmit Antenna Modes in Soft Handover

The invention claimed is:

1. A method in a base station associated with a mobile terminal in a cellular communication network comprising a control node, the method comprising:
obtaining information related to a prioritized set of allowed uplink transmit diversity modes that are currently allowed for the mobile terminal, wherein the prioritized set of allowed transmit diversity modes is selected from at least Uplink Multiple Input Multiple Output, Closed Loop Transmit Diversity, Open Loop Transmit Diversity, and a default transmit mode, and the prioritized set of allowed uplink transmit diversity modes comprises the uplink transmit diversity modes of equal or lower power priority level, as compared to the uplink transmit diversity mode configured for the mobile terminal by the control node;

selecting the highest priority uplink transmit diversity mode for the mobile terminal from the prioritized set of allowed uplink transmit diversity modes, based on information concerning the mobile terminal, available in the base station; and indicating the selected uplink transmit diversity mode to the mobile terminal.

2. The method according to claim 1, wherein the base station is at least one of the following: the serving base station of the mobile terminal, and a base station in the active set of the mobile terminal.

3. The method according to claim 1, further comprising receiving an acknowledgement from the mobile terminal when the indication has been received by the mobile terminal.

4. The method according to claim 1, further comprising informing the control node of the selected uplink transmit diversity mode.

5. The method according to claim 1, further comprising adapting one or more of: i) the number of control channels between the base station and the mobile terminal in accordance with a change of uplink transmit diversity mode of the mobile terminal and ii) the structure of control channels between the base station and the mobile terminal in accordance with the change of uplink transmit diversity mode of the mobile terminal.

6. The method according to claim 1, further comprising transmitting a transmit mode change request to the control node when a preferred uplink transmit diversity mode is not comprised in the prioritized set of allowed uplink transmit diversity modes.

7. A method in a mobile terminal in a cellular communication network comprising a control node and a base station associated with the mobile terminal, the method comprising:

receiving an indication from the base station of an uplink transmit diversity mode selected by said base station from a prioritized set of uplink transmit diversity modes currently allowed by the control node, wherein the prioritized set of allowed transmit diversity modes is selected from at least Uplink Multiple Input Multiple Output, Closed Loop Transmit Diversity, Open Loop Transmit Diversity, and a default transmit mode, and the prioritized set of allowed uplink transmit diversity modes comprises the uplink transmit diversity modes of equal or lower power priority level, as compared to the uplink transmit diversity mode configured for the mobile terminal by the control node;

changing to the uplink transmit diversity mode indicated by the base station; and acknowledging a change of uplink transmit diversity mode to the base station.

8. The method according to claim 7, wherein the base station is at least one of the following: the serving base station of the mobile terminal, and a base station in the active set of the mobile terminal.

9. A method in a control node in a cellular communication network, connected to a base station associated with a mobile terminal, the method comprising:

determining, out of a number of possible uplink transmit diversity modes, a prioritized set of uplink transmit diversity modes that are allowed for the base station to select for the mobile terminal, wherein the prioritized set of allowed transmit diversity modes is selected from at least Uplink Multiple Input Multiple Output, Closed Loop Transmit Diversity, Open Loop Transmit Diversity, and a default transmit mode; and indicating the prioritized set of allowed uplink transmit diversity modes to the base station, wherein the prioritized set of allowed uplink transmit diversity modes comprises the uplink transmit diversity modes of equal or lower priority level, as compared to the uplink transmit diversity mode configured for the mobile terminal by the control node.

10. The method according to claim 9, wherein the set of allowed uplink transmit diversity modes is implicitly determined by the determining of to which uplink transmit diversity mode the UE is to be configured by the control node.

11. The method according to claim 9, wherein the allowed uplink transmit diversity modes are at least partly implicitly indicated to the base station.

12. The method according to claim 9, wherein the allowed uplink transmit diversity modes are at least partly indicated by a uplink transmit diversity mode configured for the mobile terminal by the control node.

13. The method according to claim 9, further comprising receiving information from the base station concerning an uplink transmit diversity mode selected for the UE by the base station.

14. The method according to claim 9, further comprising informing other nodes in the cellular communication network of the uplink transmit diversity mode currently selected for the UE by the base station.

15. The method according to claim 9, further comprising receiving a transmit mode change request from the base station, requesting the control node to change the transmit mode of the mobile terminal to a certain uplink transmit diversity mode.

16. The method according to claim 9, wherein the base station is at least one of the following: the serving base station of the mobile terminal, and a base station in the active set of the mobile terminal.

17. An arrangement in a mobile terminal, comprising:

a processor; and a memory connected to the processor, wherein the memory comprises computer readable code executable by the processor to perform the steps of:

receiving an indication from a base station of an uplink transmit diversity mode selected by said base station from a prioritized set of currently allowed uplink transmit diversity modes, wherein the prioritized set of currently allowed transmit diversity modes is selected from at least Uplink Multiple Input Multiple Output, Closed Loop Transmit Diversity, Open Loop Transmit Diversity, and a default transmit mode, and the prioritized set of allowed uplink transmit diversity modes comprises the uplink transmit diversity modes of equal or lower power priority level, as compared to the uplink transmit diversity mode configured for the mobile terminal by the control node;

changing to the uplink transmit diversity mode indicated by the base station; and acknowledging a change of uplink transmit diversity mode to the base station.

18. The arrangement according to claim 17, wherein the base station is at least one of the following: the serving base station of the mobile terminal, and a base station in the active set of the mobile terminal.

19. An arrangement in a control node connected to a base station associated with a mobile terminal, the arrangement comprising:

a processor;

a memory connected to the processor, wherein the memory comprises computer readable code executable by the processor to perform the steps of:

determining a prioritized set of allowed uplink transmit diversity modes, out of a number of possible uplink transmit diversity modes, that the base station is allowed to select for the mobile terminal, wherein the prioritized set of allowed transmit diversity modes is selected from at least Uplink Multiple Input Multiple Output, Closed Loop Transmit Diversity, Open Loop Transmit Diversity, and a default transmit mode;

determining the allowed uplink transmit diversity modes to comprise the uplink transmit diversity modes of equal or lower priority level, as compared to the uplink transmit diversity mode configured for the mobile terminal by the control node; and indicating the prioritized set of allowed uplink transmit diversity modes to the base station.

20. The arrangement according to claim 19, further configured to, at least partly, indicate the allowed uplink transmit diversity modes to the base station implicitly.

21. The arrangement according to claim 19, configured to, at least partly, indicate the allowed uplink transmit diversity modes by configuring an uplink transmit diversity mode for the mobile terminal.

22. The arrangement according to claim 19, wherein the memory comprises computer readable code executable by the processor to perform the step of receiving information from the base station concerning an uplink transmit diversity mode selected for the UE by the base station.

23. The arrangement according to claim 19, wherein the memory comprises computer readable code executable by the processor to perform the step of informing other nodes in the cellular communication network of the uplink transmit diversity mode currently selected for the UE by the base station.

24. The arrangement according to claim 19, wherein the memory comprises computer readable code executable by the processor to perform the step of receiving a transmit mode change request from the base station, requesting the control node to change the uplink transmit diversity mode of the mobile terminal to a certain uplink transmit diversity mode.

25. The arrangement according to claim 19, wherein the base station is at least one of the following: the serving base station of the mobile terminal, and a base station in the active set of the mobile terminal.

26. A computer program product comprising a non-transitory computer readable medium storing a computer program comprising computer readable code, the computer readable code comprising:

code for obtaining information related to a prioritized set of uplink transmit diversity modes that are currently allowed for a mobile terminal, wherein the prioritized set of allowed transmit diversity modes is selected from at least Uplink Multiple Input Multiple Output, Closed Loop Transmit Diversity, Open Loop Transmit Diversity, and a default transmit mode, and the prioritized set of allowed uplink transmit diversity modes comprises the uplink transmit diversity modes of equal or lower priority level, as compared to the uplink transmit diversity mode configured for the mobile terminal by the control node;

code for selecting the highest priority uplink transmit diversity mode for the mobile terminal from the set of currently allowed uplink transmit diversity modes, based on information concerning the mobile terminal; and code for indicating the selected uplink transmit diversity mode to the mobile terminal.

* * * * *